(12) United States Patent
Bokelmann et al.

(10) Patent No.: US 7,758,127 B2
(45) Date of Patent: Jul. 20, 2010

(54) HEIGHT ADJUSTABLE HEAD RESTRAINT FOR A VEHICLE SEAT

(75) Inventors: Tobias Bokelmann, Groebenzell (DE); Klaus Boes, Allershausen (DE); Markus Schmid, Allershausen (DE); Achim Tscherbner, Ingolstadt (DE); Stefan Brunner, Freising (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/260,642

(22) Filed: Oct. 29, 2008

(65) Prior Publication Data

US 2009/0184556 A1     Jul. 23, 2009

Related U.S. Application Data

(60) Provisional application No. 61/023,001, filed on Jan. 23, 2008.

(51) Int. Cl.
    *A47C 7/36* (2006.01)
(52) U.S. Cl. ..................................................... 297/410
(58) Field of Classification Search ................ 297/410, 297/391
    See application file for complete search history.

(56) References Cited

U.S. PATENT DOCUMENTS

| | | | | |
|---|---|---|---|---|
| 3,563,602 | A * | 2/1971 | Ohta et al. | 297/410 |
| 5,445,434 | A | 8/1995 | Kohut | |
| 6,364,415 | B1 * | 4/2002 | Mori et al. | 297/410 |
| 6,390,558 | B2 | 5/2002 | Fischer et al. | |
| 6,899,395 | B2 | 5/2005 | Yetukuri et al. | |
| 6,983,995 | B1 | 1/2006 | Veine et al. | |
| 7,073,863 | B1 | 7/2006 | Low et al. | |
| 7,137,668 | B2 * | 11/2006 | Kreitler | 297/410 |
| 7,232,187 | B1 | 6/2007 | Sundararajan et al. | |
| 7,316,455 | B2 * | 1/2008 | Metz et al. | 297/410 |
| 2001/0028191 | A1 | 10/2001 | Lance | |
| 2005/0146190 | A1 * | 7/2005 | Taatjes | 297/410 |
| 2007/0216211 | A1 | 9/2007 | Mori | |
| 2008/0001456 | A1 | 1/2008 | Muller et al. | |

FOREIGN PATENT DOCUMENTS

DE     19603911 A1     8/1997

(Continued)

OTHER PUBLICATIONS

U.S. Appl. No. 12/194,375, Height Adjustable Head Restraint for a Vehicle Seat, filed Aug. 19, 2008, 16 pages.

*Primary Examiner*—Milton Nelson, Jr.
(74) *Attorney, Agent, or Firm*—Brooks Kushman P.C.

(57) ABSTRACT

A vehicle seat head restraint assembly is provided with a stop mounted to a rod of a vehicle seat back. A frame is mounted to the rod to slide therealong. A head restraint is mounted to the frame. A shaft cooperates with the stop and the frame and includes a series of notches and the stop includes at least one projection that engages the notches in a locked rotary position of the shaft. The projection is disengaged from the notches in a released rotary position of the shaft. The shaft has a cam and an actuator has a follower arrangement for releasing the shaft to slide the head restraint frame along the rod. A head restraint assembly is also provided wherein the series of notches and the projection cooperate such that height adjustment in an upward direction only is permitted without actuation of the actuator.

20 Claims, 8 Drawing Sheets

FOREIGN PATENT DOCUMENTS

| | | |
|---|---|---|
| DE | 19714283 A1 | 11/1997 |
| DE | 19632560 A1 | 2/1998 |
| DE | 10043923 A1 | 4/2002 |
| DE | 10312517 A1 | 10/2004 |
| FR | 2852066 A1 | 9/2004 |
| GB | 2302706 A | 1/1997 |
| GB | 2340744 A | 3/2000 |
| GB | 2418850 A | 4/2006 |

* cited by examiner

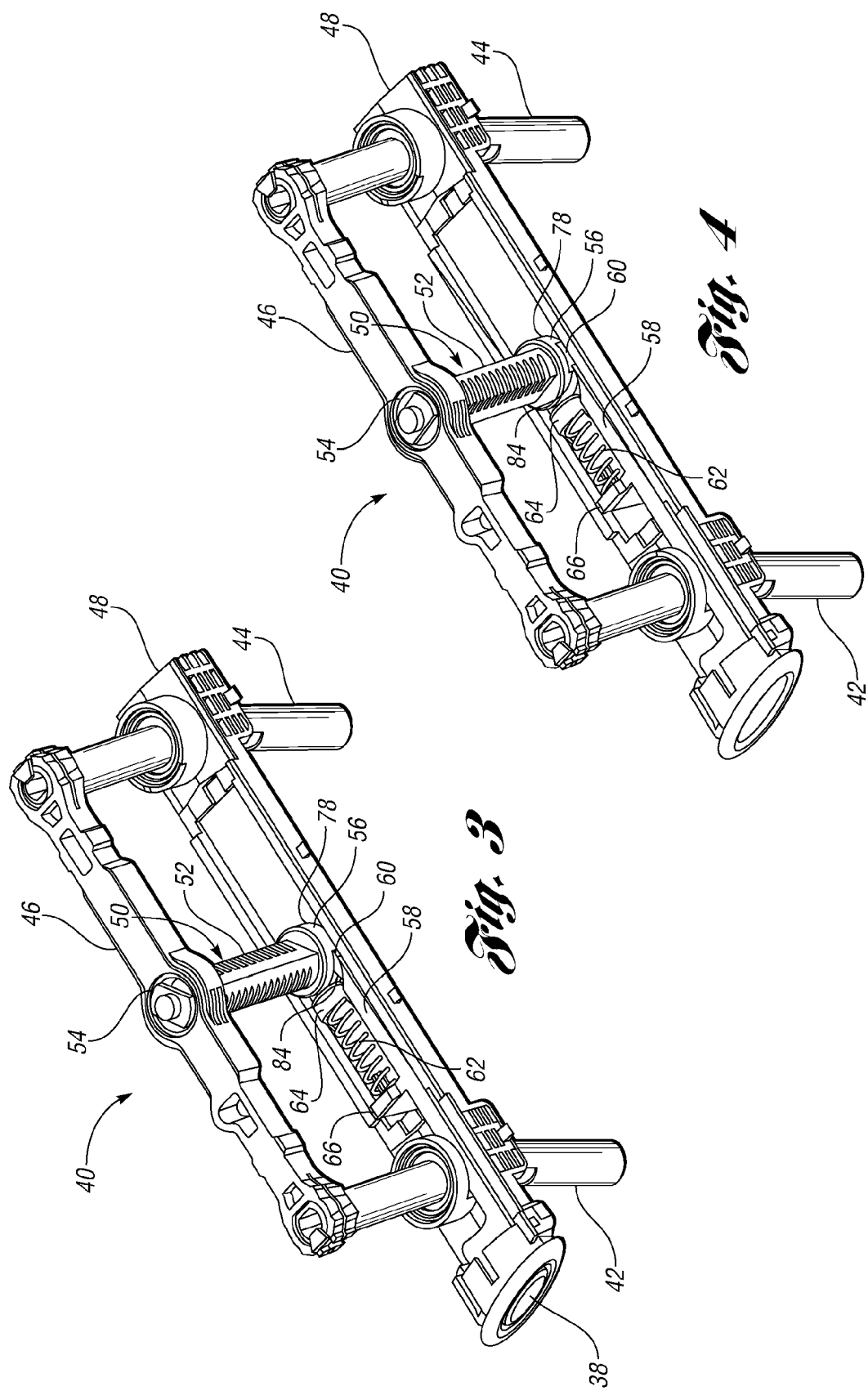

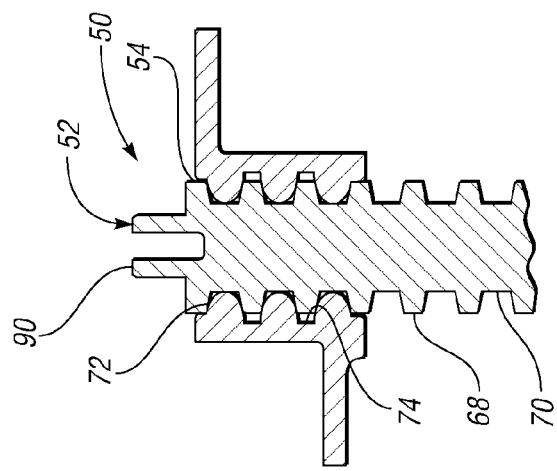
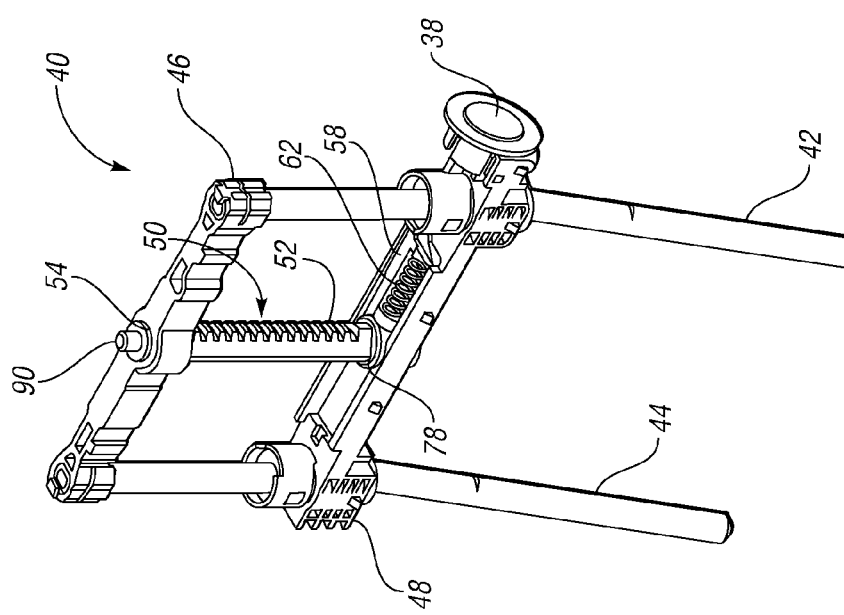
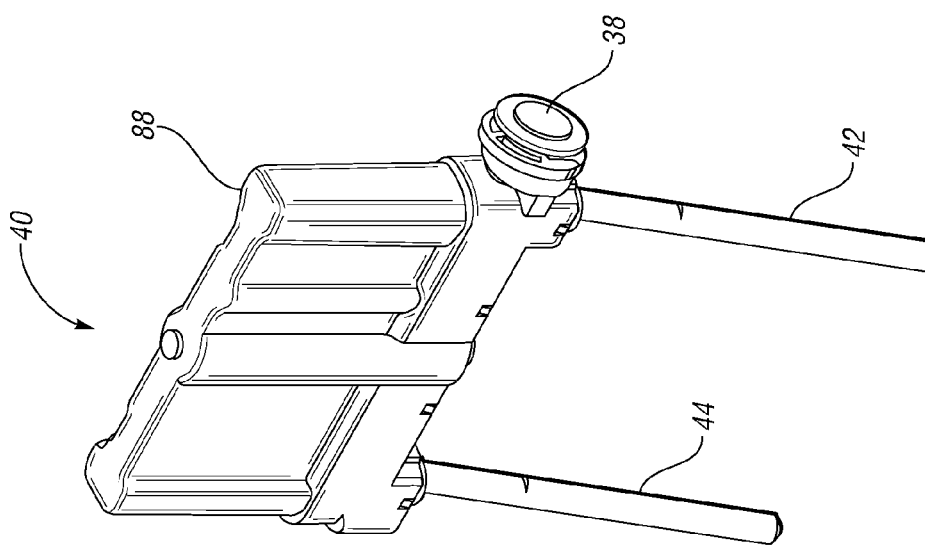

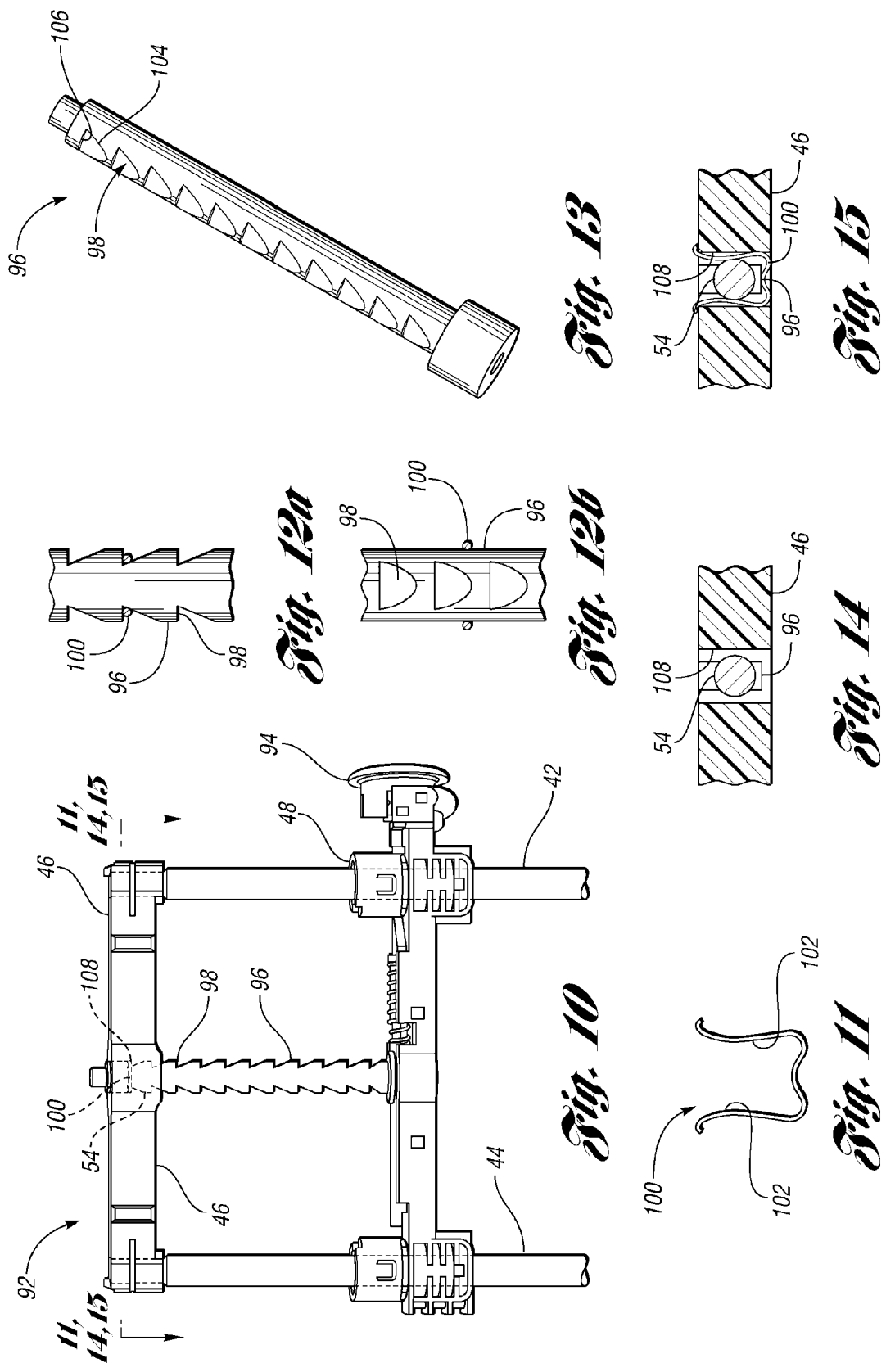

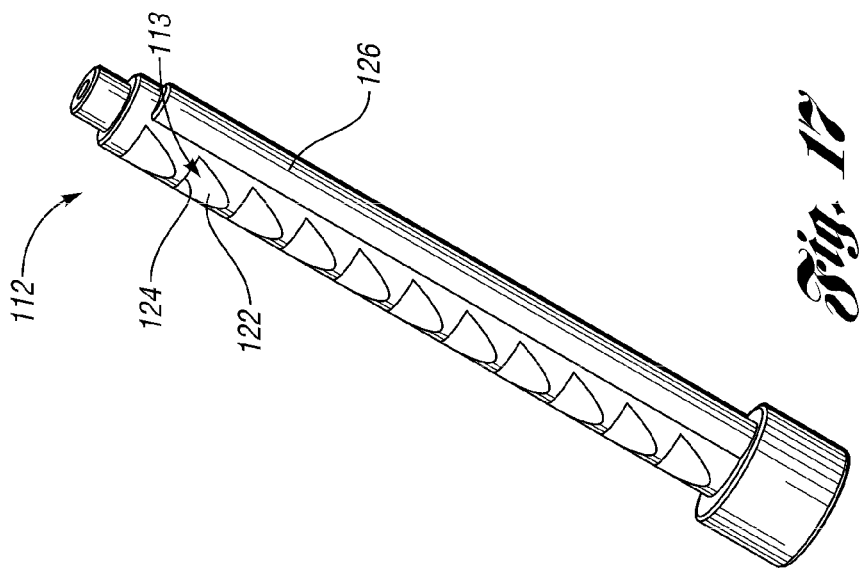
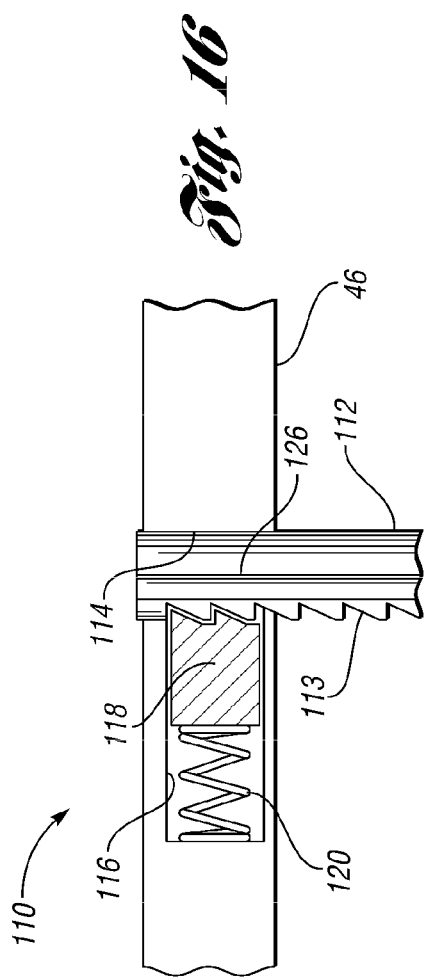
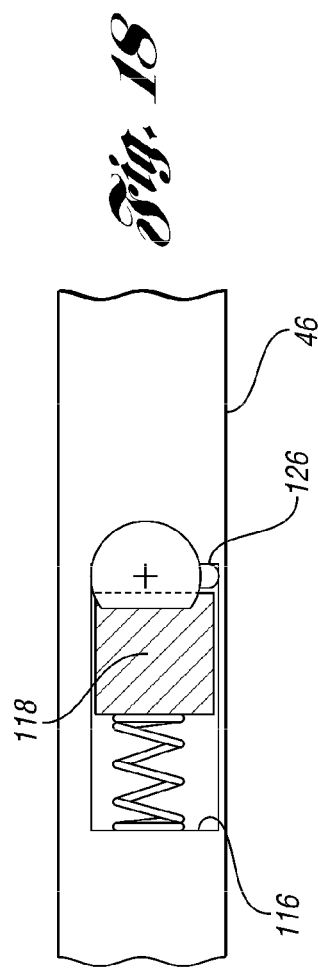
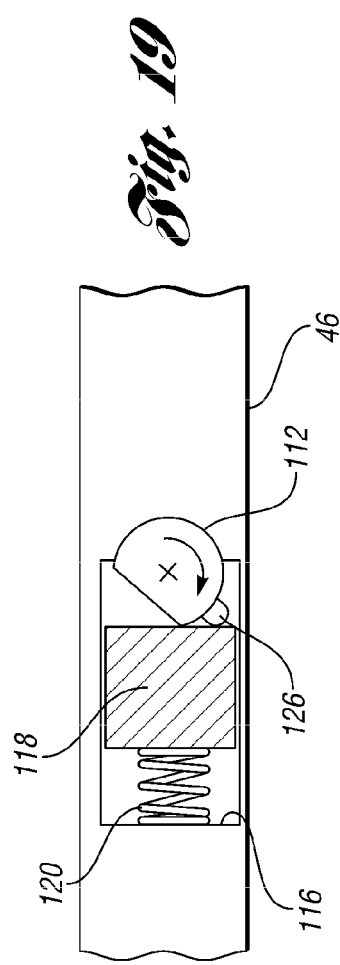

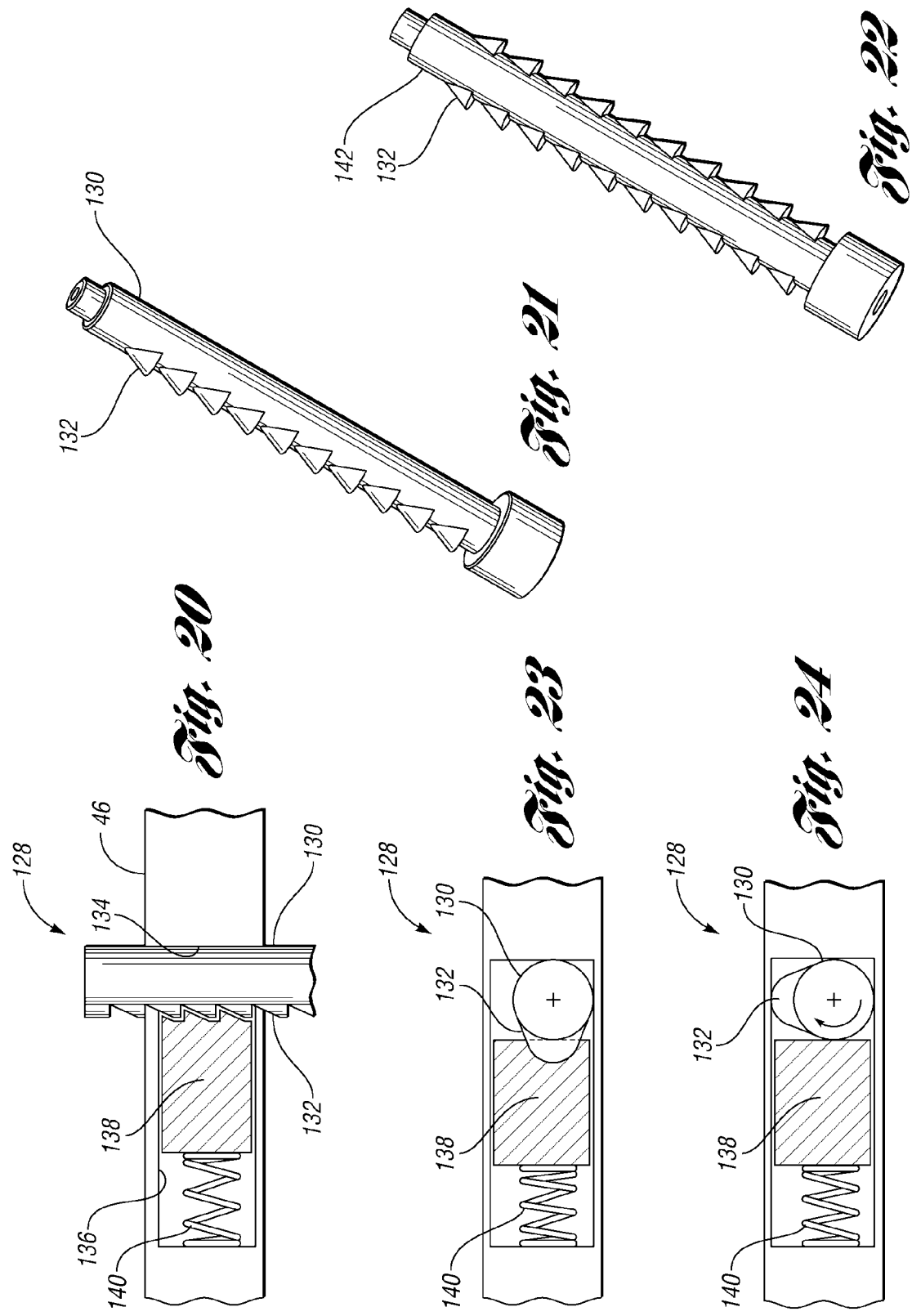

HEIGHT ADJUSTABLE HEAD RESTRAINT FOR A VEHICLE SEAT

CROSS REFERENCE TO RELATED APPLICATIONS

This application claims the benefit of U.S. Provisional Application Ser. No. 61/023,001 filed Jan. 23, 2008, the disclosure of which is incorporated in its entirety by reference herein.

BACKGROUND OF THE INVENTION

1. Field of the Invention

Embodiments of the invention relate to height adjustable head restraints for vehicle seats.

2. Background Art

The prior art has provided height adjustable head restraints for vehicle seats. One such example is Yetukuri et al. U.S. Pat. No. 6,899,395 B2, which issued on May 21, 2005.

BRIEF DESCRIPTION OF THE DRAWINGS

FIG. 3 is a rear perspective view of the head restraint height adjustment mechanism of FIG. 2, illustrated in a locked position;

FIG. 4 is another rear perspective view of the head restraint height adjustment mechanism of FIG. 2, illustrated in a released position;

FIG. 5 is a front perspective view of the head restraint height adjustment mechanism of FIG. 2;

FIG. 6 is an enlarged section view of a portion of the head restraint height adjustment mechanism of FIG. 2;

FIG. 9 is another front perspective view of the head restraint height adjustment mechanism of FIG. 2;

FIG. 10 is a front elevation view of a head restraint height adjustment mechanism according to another embodiment of the present invention;

FIG. 11 is a top plan view of a wire clip of the head restraint height adjustment mechanism taken along section line 11-11 of FIG. 10;

FIG. 12a is a side elevation view of a locking shaft of the head restraint height adjustment mechanism of FIG. 10, illustrated in a locked position;

FIG. 12b is another side elevation view of the locking shaft of FIG. 12a, illustrated in a released position;

FIG. 13 is a perspective view of the locking shaft of the head restraint height adjustment mechanism of FIG. 10;

FIG. 14 is a section view of a portion of the head restraint height adjustment mechanism taken along section line 14-14 of FIG. 10, illustrated with the wire clip removed;

FIG. 15 is another section view of the portion of the head restraint height adjustment mechanism taken along section line 15-15 of FIG. 10, illustrated with the wire clip installed;

FIG. 16 is a side partial section view of a portion of a head restraint height adjustment mechanism according to another embodiment of the present invention;

FIG. 17 is a perspective view of a locking shaft of the head restraint height adjustment mechanism of FIG. 16;

FIG. 18 is a top plan view of a portion of the head restraint height adjustment mechanism of FIG. 16, illustrated in a locked position;

FIG. 19 is another top plan view of the head restraint height adjustment mechanism of FIG. 16, illustrated in a released position;

FIG. 20 is a side partial section view of a head restraint height adjustment mechanism according to another embodiment of the present invention;

FIG. 21 is a perspective view of a locking shaft of the head restraint height adjustment mechanism of FIG. 20;

FIG. 22 is a perspective view of a locking shaft of another embodiment of the head restraint height adjustment mechanism of FIG. 20;

FIG. 23 is a top plan view of a portion of the head restraint height adjustment mechanism of FIG. 20, illustrated in a locked position;

FIG. 24 is another top plan view of the portion of the head restraint height adjustment mechanism of FIG. 20, illustrated in a released position;

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 2:
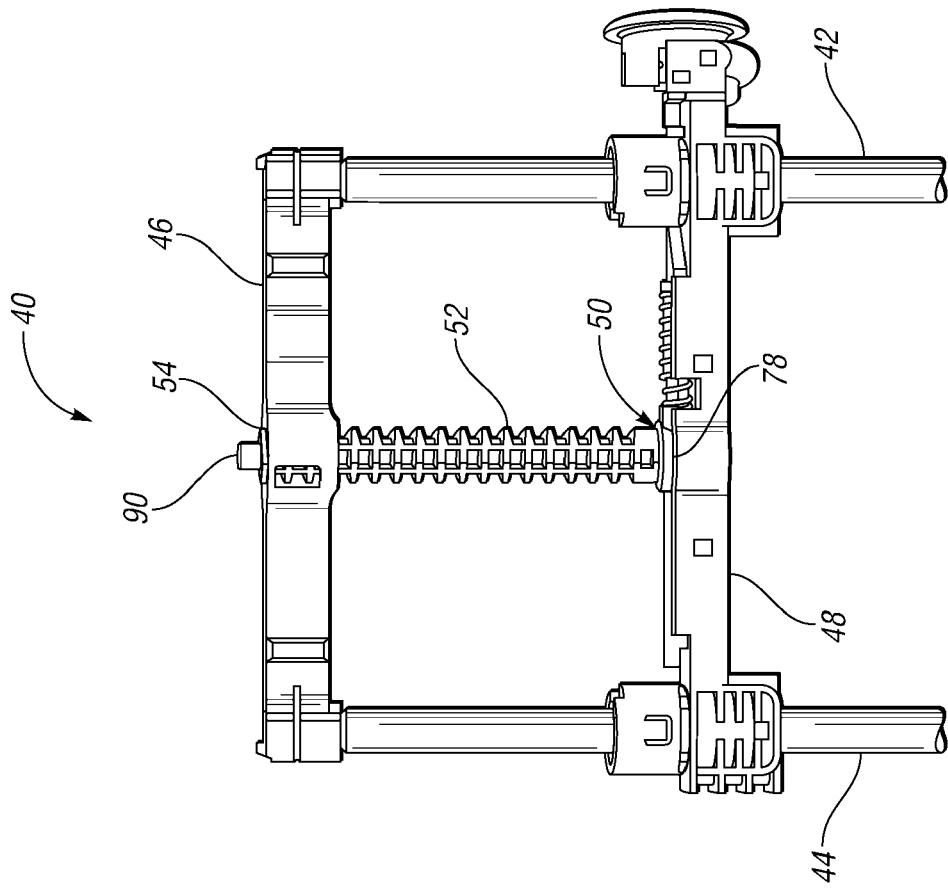
FIG. 2 is a front elevation view of a head restraint height adjustment mechanism of the vehicle seat of FIG. 1 in accordance with an embodiment of the present invention.
Figure 1:
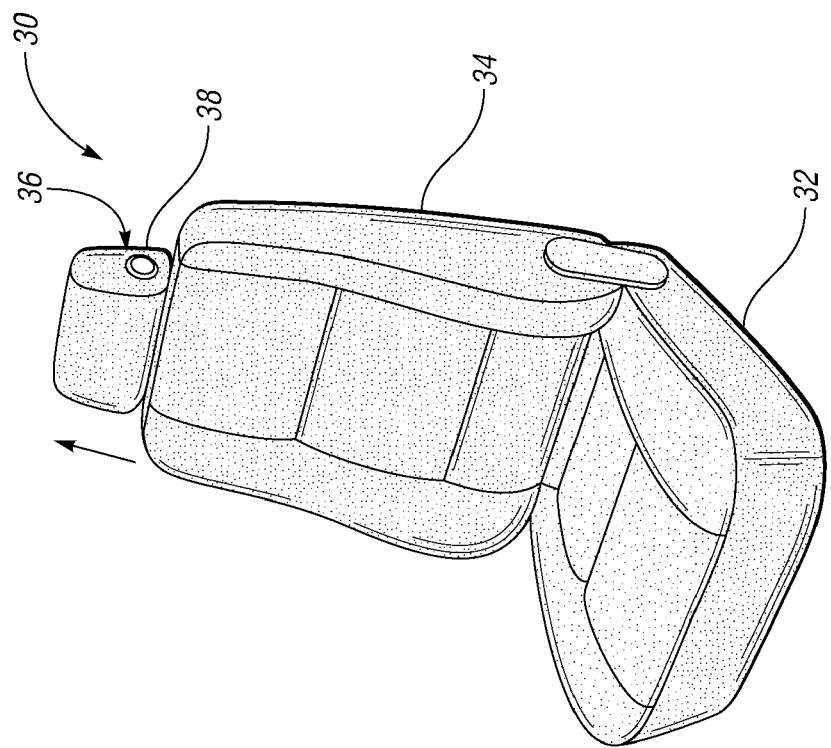
FIG. 1 is a perspective view of a vehicle seat in accordance with an embodiment of the present invention.

With reference now to FIG. 1, a vehicle seat is illustrated in accordance with an embodiment of the present invention and is referenced generally by numeral 30. The vehicle seat 30 includes a seat cushion 32 that is adapted to be installed within an interior of a vehicle, such as an automobile, aircraft, water craft, or the like. A seat back 34 is also installed in the vehicle, and for the depicted embodiment, the seat back 34 is connected to the seat cushion 32. Although an individual seat is depicted in FIG. 1, the invention contemplates any seat configuration, such as a bench seat, a split frame seat, a front row seat, a rear row seat, or the like.

The seat cushion 32 and the seat back 34 are both fabricated from suitable known materials and methods. For example, the seat cushion 32 and the seat back 34 may both utilize a structural frame, foam for cushioning, and a cover.

The seat 30 also includes a head restraint 36 that is mounted to the frame of the seat back 34 and extends above the seat back 34 for supporting a head of an occupant. The head restraint 36 has a release button 38 mounted on a lateral side of the head restraint 36 for permitting an occupant to depress the button 38 and adjust the height of the head restraint 36 relative to the seat back 34.

Referring now to FIGS. 2-5, the head restraint 36 is illustrated with a head restraint cover and foam padding removed to reveal a head restraint height adjustment mechanism 40. The height adjustment mechanism 40 includes a pair of rods 42, 44 that are mounted to a frame of a seat back 34 and extend above the seat back 34 for supporting the head restraint 36. The rods 42, 44 are connected at their distal ends by an upper transverse bar 46. Likewise, a lower transverse bar 48 is mounted to the rods 42, 44 to translate along the rods 42, 44 to perform the height adjustment of the head restraint 36. Accordingly, the lower transverse bar 48 provides a frame for the head restraint 36, and padding and a cover of the head restraint 36 are mounted directly to the lower transverse bar 48 and translate along the rods 42, 44 with the translation of the lower transverse bar 48.

The height adjustment mechanism 40 includes a locking device 50 for locking the location of the lower transverse bar 48 along the rods 42, 44 relative to the upper transverse bar 46. The locking device 50 includes a locking shaft 52 that is oriented generally centrally on the lower transverse bar 48 between the rods 42, 44. The locking shaft 52 is generally parallel to the regions of the rods 42, 44 upon which the lower transverse bar 48 translates for height adjustment of the head restraint 36. The locking shaft 52 is pivotally connected to the lower transverse bar 48 and extends to the upper transverse bar 46. The locking shaft 52 extends through a bore 54 in the upper transverse bar 46 and cooperates with the bore 54, which provides a stop for locking the lower transverse bar 48 relative to the upper transverse bar 46.

The locking shaft 52 is illustrated in a locked position in FIG. 3. The locking shaft 52 includes an offset projection 56 formed upon its lower end adjacent to the lower transverse bar 48. The release button 38 is mounted on a lateral end of the lower transverse bar 48. The release button 38 cooperates with an actuation bar 58 to slide along the lower transverse bar 48. The actuation bar 58 includes a cam surface 60 formed on a lateral end in engagement with the offset projection 56 of the locking shaft 52. The lower transverse bar 48 constrains the actuation bar 58 for linear translation relative to the lower transverse bar 48. Thus, when the release button 38 is actuated, the actuation bar 58 is translated towards the rod 44 thereby rotating the locking shaft 52 counterclockwise in FIG. 3 to a released position as illustrated in FIG. 4 whereby height adjustment of the head restraint 36 is permitted. A coil compression spring 62 is mounted in a receiver 64 on the lower transverse bar 48 and engages a tab 66 extending from the actuation bar 58 to bias the actuation bar 58 to a locked position in FIG. 2, thereby locking the head restraint 36 in absence of a force imparted upon the release button 38.

Referring now to FIG. 6, the locking shaft 52 and upper transverse bar 46 are illustrated in the locked position. The locking shaft 52 has a series of incrementally spaced projections 68 formed upon a pair of outboard sides of the shaft 52, and the projections 68 are spaced longitudinally along the locking shaft 52 by a series of recesses 70. Thus, the projections 68 provides two rows of teeth upon a pair of sides of the shaft 52, and the projections 68 extend radially outward from lateral regions of the locking shaft 52.

Likewise, the bore 54 of the upper transverse bar 46 includes a corresponding series of projections 72 sized to be received within the recesses 70 of the locking shaft 52. The projections 72 are provided on a pair of sides of the bore 54 and are spaced incrementally by a series of recesses 74 for receiving the projections 68 of the locking shaft 52. The bore projections 72 are provided on both sides of the bore 54 and extend laterally inboard for providing teeth that are engaged with the teeth 68 of the shaft 52 when in the locked position, which is illustrated in FIGS. 3 and 6.

Figure 7:
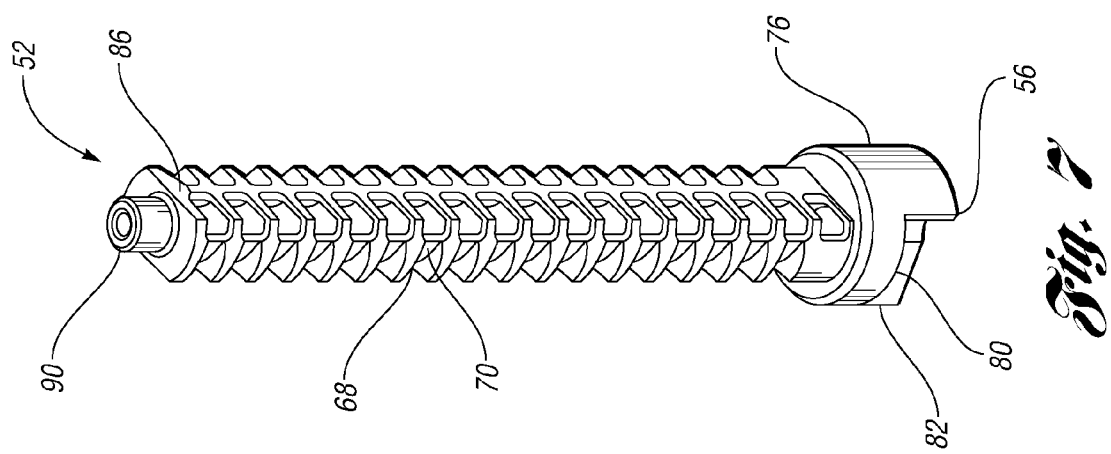
FIG. 7 is an enlarged perspective view of a locking shaft of the head restraint height adjustment mechanism of FIG. 2.

Referring now to FIG. 7, the locking shaft 52 is illustrated in greater detail. The locking shaft 52 has a lower cylindrical end 76 that is received within a blind bore 78 in the lower transverse bar 48. A recess 80 is formed in the cylindrical end 76 to provide the offset projection 56, which is engaged by the cam surface 60 of the actuation bar 58 for rotating the locking shaft 52 to the released position. The recess 80 also provides a second offset projection 82 for returning the locking shaft 52 to the locked position. Referring again to FIG. 4, the actuation bar 58 includes an inward cam surface 84 that extends radially inward. When the locking shaft 52 is actuated to the unlocked position illustrated in FIG. 4, the second offset projection 82 extends in front of the path of the inward cam surface 84 in the unlocked position. Thus, when the compression spring 62 returns the actuation bar 58 as illustrated in FIG. 3, the inward cam surface 84 engages the second offset projection 82 and returns the locking shaft 52 to the locked position illustrated in FIG. 3.

Referring again to FIG. 7, the locking shaft 52 has teeth 68 on opposed sides for engaging the teeth 72 of the bore 54. Additionally, the shaft 52 has a pair of flats 86 formed on lateral sides, which are offset by approximately ninety degrees from the teething 68 so that the teething 68 disengage from the bore teeth 72 in the released position.

Figure 8:
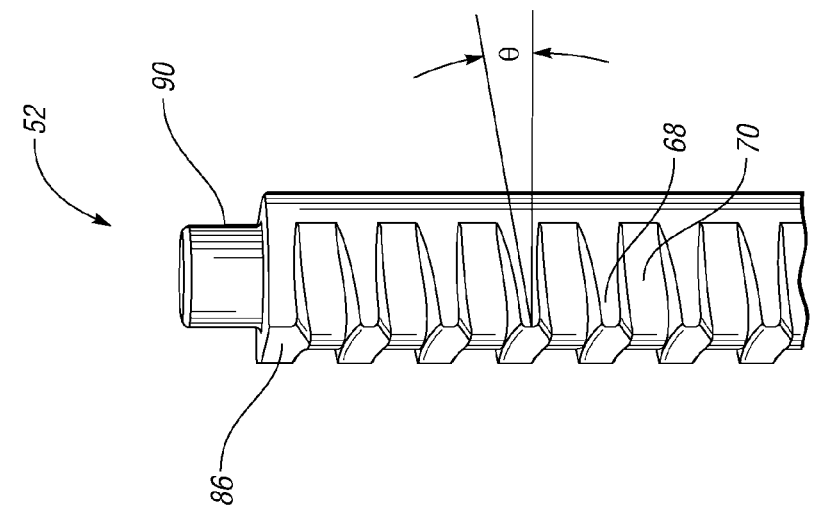
FIG. 8 is an enlarged elevation view of the locking shaft of FIG. 7.

Referring now to FIG. 8, the shaft teething 68 are provided with a pitch angle $\theta$. The pitch angle $\theta$ provides leading edges on the teeth 68 to minimize the occurrence of interference with the bore teeth 72 and for guiding the shaft teeth 68 into the bore teeth 72. According to one embodiment, the pitch angle $\theta$ is seven degrees.

As stated above, actuation of the release button 38 translates the actuation bar 58 towards the rod 44 thereby rotating the locking shaft 52 counterclockwise to disengage the shaft projections 68 and recesses 70 from the bore projections 72 and recesses 74. Referring again to FIG. 4, the actuation bar 58 is illustrated translated towards the rod 44 and consequently the locking shaft 52 is in the released position. The locking shaft 52 has been rotated such that the shaft projections 68 and recesses 70 are rotated out of engagement with the bore projections 72 and recesses 74. Thus, in the unlocked position of FIG. 4, the user may translate the lower transverse bar 48 and the head restraint 36 along the rods 42, 44 until a desired height adjustment position is achieved. Once the desired height adjustment position is selected, the user removes a manual force from the release button 38. Then, the spring 62 expands thereby translating the actuation bar 58 towards the rod 42, which drives the inward cam surface 84 against the second offset projection 82, thereby rotating the locking shaft 52 clockwise in FIG. 4 until the shaft 52 is in the locked position illustrated in FIG. 3.

Thus, the height adjustment mechanism 40 permits simplified height adjustment of the head restraint 36. An adjustment may be performed manually with one hand by depressing the release button 38 and translating the head restraint 36 to the desired height adjustment. By eliminating height adjustment notches in the rods 42, 44, which are common in the prior art, the wall thickness of the rods 42, 44 can be reduced thereby reducing the weight and complexity of the rods 42, 44 and providing a cost savings in the materials of the rods 42, 44. Additionally, various head restraint rods 42, 44 configurations and cross sections are possible by elimination of the lock mechanism upon the rods 42, 44.

Prior art head restraint height adjustment mechanisms that utilize notches in the head restraint rods are limited in the number of adjustment positions. The head restraint rods are structural members and therefore the notches are adequately spaced to prevent weakening of the head restraint rods. The height adjustment mechanism 40 provide more adjustment positions since the notches are not provided on the head restraint rods 42, 44.

The components of the head restraint height adjustment mechanism 40 may be formed from suitable materials, such as structural plastics or metals. Thus, the complexity of locking the head restraint 36 relative to the seat back 34 is removed from the rods 42, 44 and concealed within the head restraint 36. Additionally, a secured locking arrangement is provided by engagement of teeth 68 of the locking shaft 52 with corresponding teeth 72 of the bore 54 of the upper transverse bar 46. Thus, the locking arrangement is more secure and stable than a prior art single detent with a recess; and reduction in buzz, squeak and rattle is provided by the enhanced locking arrangement.

Referring now to FIG. 9, the height adjustment mechanism 40 is illustrated concealed within a shell 88. The shell 88 is mounted to the lower transverse bar 48 and conceals the upper transverse bar 46 and locking device 50 along multiple height adjustment positions of the height adjustment mechanism 40. The foam padding of the head restraint 36 may be formed directly upon the shell 88, and subsequently a cover may be provided over the foam and shell 88 to provide a completed head restraint 36. In at least one embodiment, an upper end of the shaft 52 provides an upper cylindrical end 90 that is journalled directly within the shell 88 for providing bearing support to the distal end of the shaft 52 that extends through the upper transverse bar 46.

Referring now to FIG. 10, a height adjustment mechanism 92 is illustrated according to another embodiment of the present invention. Unlike the prior embodiment, the height adjustment mechanism 92 permits height adjustment in an upward direction without actuation of a locking device 94. Therefore, the user may manually adjust the height in an upper direction by translating the head restraint 36 upwards. In order to lower the head restraint 36, the user is required to actuate the locking device 94. Thus, the head restraint 36 is supported in the locked position, but permits adjustment in the upward direction. The locking device 94 includes a release button 38 for actuating an actuator bar 58 as in the prior embodiment. The actuator bar 58 rotates a control shaft 96. The control shaft 96 includes a series of notches 98 formed in opposed lateral sides of the control shaft 96. A wire clip 100 is mounted within the upper transverse bar 46 intersecting the bore 54 for engaging the notches 98. The wire clip 100 is illustrated in FIG. 11, which includes a pair of inwardly extending arms 102 that intersect into the bore 54 for receiving the detents 98.

Referring now to FIGS. 12a and 12b, the cooperation of the control shaft 96 and the wire clip 100 is illustrated in greater detail. FIG. 12a illustrates the control shaft 96 in the locked position with the arms 102 of the wire clip 100 extending into the notches 98. If the user desires to raise the head restraint, the user moves the head restraint in an upward direction in FIG. 12a, such that the wire clip 100 engages leading edges within the notches 98 and is urged outboard about the diameter of the control shaft 96. The notches 98 include abutment portions so that the head restraint 36 is secured in the height position in the downward direction to prevent downward motion of the head restraint 36.

In order to unlock the locking device 94, the user actuates the release button 38, which translates the actuation bar 58 thereby rotating the control shaft 96 to the released position of FIG. 12b. As the control shaft 96 rotates, the diameter of the control shaft 96 urges the arms 102 of the wire clip 100 outboard about the diameter of the shaft thereby permitting height adjustment of the head restraint 36 in both directions.

FIG. 13 illustrates the control shaft 96 in greater detail, which is similar to the locking shaft 52 of the prior embodiment, however includes notches 98 on a pair of opposed lateral sides, each notch having a leading edge 104 and an abutment edge 106.

FIG. 14 illustrates a slot 108 formed in the upper transverse bar 46 intersecting the bore 54. FIG. 15 illustrates the wire clip 100 installed in the slot 108 such that the arms 102 intersect the bore 54 for engaging the notches 98 formed in the control shaft 96.

Referring now to FIG. 16, another height adjustment mechanism 110 is illustrated according to another embodiment of the invention. The height adjustment mechanism 110 includes a control shaft 112 with a series of notches 113, extending through a bore 114 in the upper transverse bar 46. A cavity 116 is provided within the upper transverse bar 46 intersecting with the bore 114. A toothed slide block 118 is provided in the cavity 116 to translate within the cavity 116. A compression spring 120 is provided within the cavity 116 for urging the slide block 118 into engagement with the notches 113 of the control shaft 112 thereby locking the control shaft 112 and consequently the head restraint 36 from downward movement in the locked position illustrated in FIG. 16.

The control shaft 112 is also illustrated in FIG. 17. The control shaft 112 includes a series of notches 113 on one lateral side, each having a leading edge 122 extending downward and an abutment edge 124. Thus, the user can move the head restraint 36, and consequently the control shaft 112, upward thereby urging the slide block 118 to compress the compression spring 120 as the control shaft 112 moves upward. In order to move the head restraint 36 downward, the user must press the release button 38 for rotating the control shaft 112. The control shaft 112 includes a lengthwise cam 126 formed upon a lateral side adjacent to the notches 113. Referring now to FIGS. 18-19, the control shaft 112 is illustrated in the locked position in FIG. 18. In FIG. 19, as the control shaft 112 is rotated clockwise, the cam 126 engages the slide block 118 and translates the slide block 118 outboard thereby compressing the compression spring 120 and disengaging the slide block 118 from the notches 113. The disengagement of the slide block 118 from the notches 113 of the control shaft 112 permits downward height adjustment of the control shaft 112 and consequently the head restraint 36.

Referring now to FIG. 20, another height adjustment mechanism 128 is illustrated with a control shaft 130 having a series of inclined projections 132. The control shaft 130 extends through a bore 134 in the upper transverse bar 46. A cavity 136 is formed in the upper transverse bar 46 and receives a toothed slide block 138. A compression spring 140 is housed within the cavity 136 for urging the slide block 138 into engagement with the control shaft 130. Referring now to FIG. 21, the control shaft 130 is illustrated with a series of inclined projections 132 extending from one lateral side.

Alternatively, a control shaft 142 may be employed as in FIG. 22 with inclined projections 132 extending from both lateral sides. Accordingly, a pair of slide blocks 138 would be employed for engaging the inclined projections 132 on both lateral sides of the control shaft 142.

Referring again to the control shaft 130 of FIG. 21, the inclined projections 132 engage a slide block 138 as illustrated in the locked position of FIGS. 20 and 23. The user may adjust the height of the head restraint 36 by translating the head restraint 36 upward such that the inclined projections 132 urge the slide block 138 outboard thereby compressing the compression spring 140 and permitting upward height adjustment. Due to the abutment surfaces of the inclined projections 132, downward travel of the head restraint is not permitted in the locked position. When the control shaft 130 is rotated into the released position of FIG. 24, the inclined projections 132 are disengaged from the slide block 138 and height adjustment of the head restraint 36 in both directions is permitted.

Figures 26, 27:
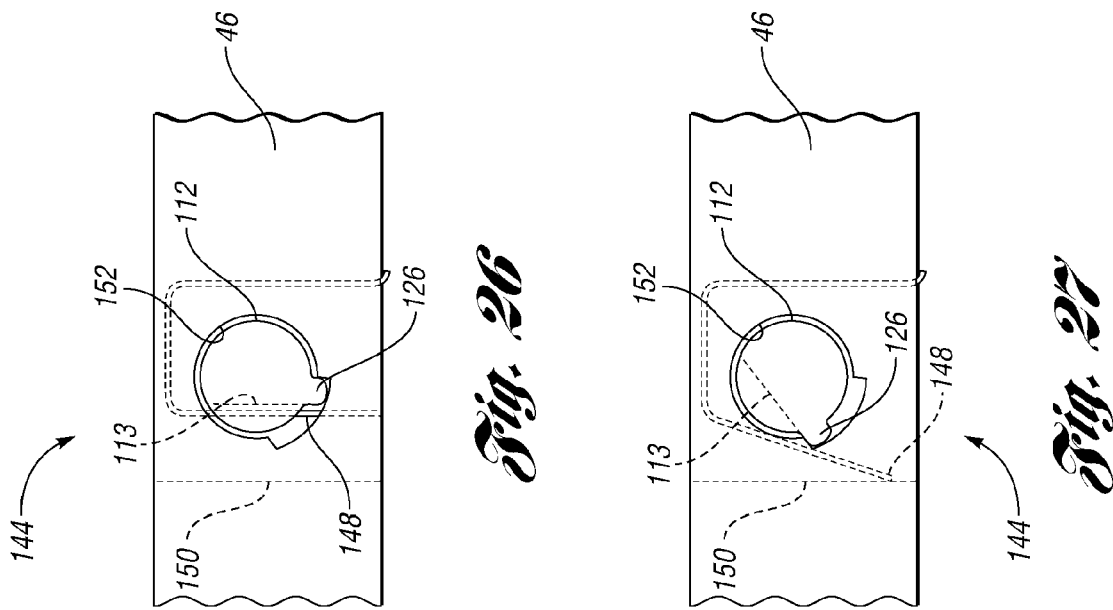
FIG. 26 is a top plan view of a portion of the head restraint height adjustment mechanism of FIG. 25, illustrated in a locked position.
FIG. 27 is another top plan view of the portion of the head restraint height adjustment mechanism of FIG. 25, illustrated in a released position.
Figure 25:
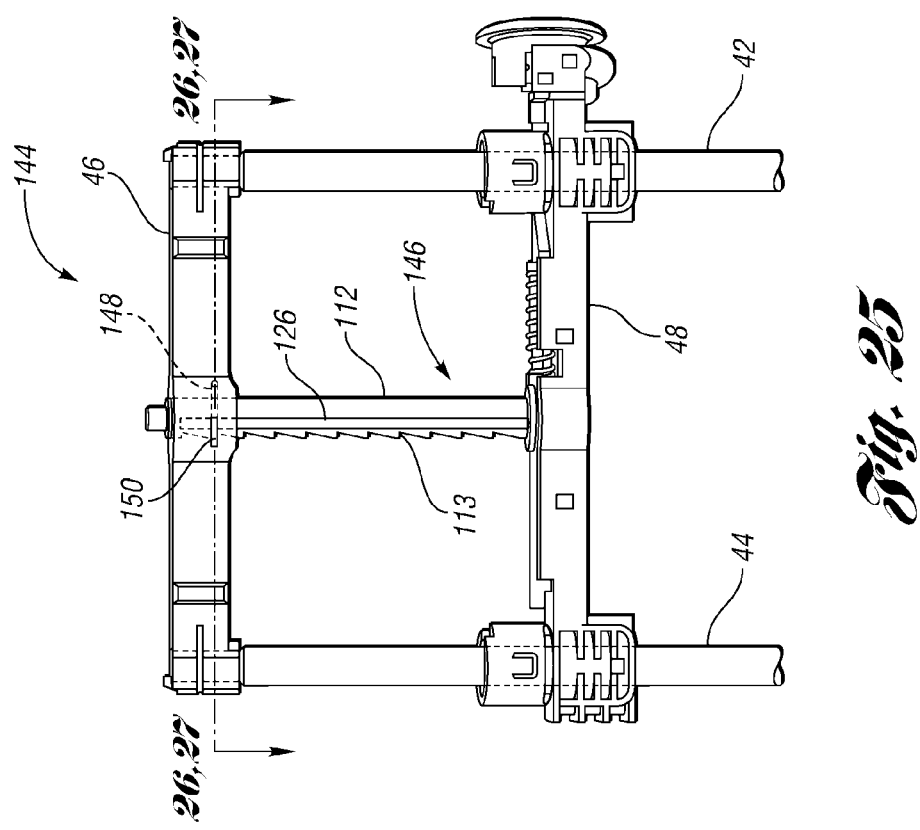
FIG. 25 is a front side elevation view of a head restraint height adjustment mechanism according to yet another embodiment of the present invention.

Referring now to FIG. 25, another height adjustment mechanism 144 embodiment is illustrated in accordance with the present invention. The height adjustment mechanism 144 includes a locking device 146 that employs the control shaft 112 that was illustrated previously in FIG. 17. Referring now to FIGS. 26 and 27, a wire clip 148 is mounted within a slot 150 that intersects a bore 152 of the upper transverse bar 46. In the locked position of FIGS. 25 and 26, upward movement of the head restraint 36 and consequently the control shaft 112 urges the wire clip 148 out of engagement with the notches 113 of the control shaft 112 thereby permitting upward height adjustment. However, the abutment edges 124 prevent downward translation of the control shaft 112 and the head restraint 36 from the locked position of FIGS. 25 and 26. When the locking device 146 is released by manual actuation, the control shaft 112 rotates as illustrated in FIG. 27 and the cam 126 engages the wire clip 148 and urges the wire clip 148 out of engagement from the notches 113 thereby permitting vertical height adjustment in both directions.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat head restraint assembly comprising:
   a stop adapted to be mounted to a rod extending from a vehicle seat back;
   a frame adapted to be mounted to the rod to slide along the rod;
   a head restraint mounted to the frame for supporting a head of an occupant;
   a shaft cooperating with the stop and the frame, one of the shaft and the stop including a longitudinal series of notches, and the other of the shaft and the stop including at least one projection that engages one of the series of notches in a locked rotary position of the shaft for permitting incremental locking positions of the frame relative to the stop, such that the at least one projection is disengaged from the series of notches in a released rotary position of the shaft for sliding the head restraint and frame along the rod, the shaft having one of a cam and follower arrangement; and
   an actuator having the other of the cam and follower arrangement in cooperation with the one of the cam and follower arrangement of the shaft for releasing the shaft to slide the head restraint and frame along the rod.

2. The head restraint assembly of claim 1 wherein the shaft further comprises an offset projection; and
   wherein the actuator further comprises a cam surface in engagement with the offset projection.

3. The head restraint assembly of claim 2 further comprising a biasing member cooperating with the actuator for urging the actuator into a locked position in absence of an external force;
   wherein the actuator further comprises an inward cam surface; and
   wherein the shaft further comprises a second offset projection cooperating with the inward cam surface of the actuator for rotating the shaft to the locked position as the actuator returns to the locked position.

4. The head restraint assembly of claim 1 wherein the shaft includes the at least one projection, the at least one projection further comprising a longitudinal series of external teeth, and the stop includes the longitudinal series of notches, the longitudinal series of notches further comprising a longitudinal series of internal teeth to engage the external teeth of the shaft in the locked position of the shaft.

5. The head restraint assembly of claim 4 wherein the longitudinal series of external teeth are provided on opposed lateral sides of the shaft with flats provided therebetween; and
   wherein the longitudinal series of internal teeth of the stop are provided on opposed lateral sides for engagement with the longitudinal series of external teeth in the locked position of the shaft and for disengagement from the longitudinal series of external teeth in the released position of the shaft whereby the flats of the shaft are aligned with the longitudinal series of internal teeth of the stop.

6. The head restraint assembly of claim 4 wherein the longitudinal series of external teeth of the shaft are provided with a pitch angle to provide leading edges to minimize an occurrence of interference with the longitudinal series of internal teeth of the stop and for guiding the longitudinal series of external teeth of the shaft into engagement with the longitudinal series of internal teeth of the stop.

7. The head restraint assembly of claim 6 wherein the pitch angle is approximately seven degrees.

8. The head restraint assembly of claim 1 wherein the series of longitudinal notches and the at least one projection cooperate such that height adjustment in an upward direction only is permitted without actuation of the actuator.

9. The head restraint assembly of claim 1 wherein the shaft includes the longitudinal series of notches, and the stop includes the at least one projection.

10. A vehicle seat comprising:
    a seat back;
    at least one rod extending from the seat back;
    a head restraint assembly according to claim 1, mounted to the at least one rod.

11. A vehicle seat head restraint assembly comprising:
    a stop adapted to be mounted to a rod extending from a vehicle seat back;
    a frame adapted to be mounted to the rod to slide along the rod;
    a head restraint mounted to the frame for supporting a head of an occupant;
    a shaft cooperating with the stop and the frame, one of the shaft and the stop including a longitudinal series of notches, and the other of the shaft and the stop including at least one projection that engages one of the series of notches in a locked rotary position of the shaft for permitting incremental locking positions of the frame relative to the stop, such that the at least one projection is disengaged from the series of notches in a released rotary position of the shaft for sliding the head restraint and frame along the rod; and an actuator for disengaging the at least one projection from the notches to slide the head restraint and frame along the rod;

wherein the series of longitudinal notches and the at least one projection cooperate such that height adjustment in an upward direction only is permitted without actuation of the actuator.

12. The head restraint assembly of claim 11 wherein the shaft includes the longitudinal series of notches, and the stop includes the at least one projection.

13. The head restraint assembly of claim 12 wherein the at least one projection further comprises a biasing member for engaging the longitudinal series of notches, which is urged out of engagement with the notches when the shaft is rotated from the locked position to the released rotary position.

14. The head restraint assembly of claim 13 wherein the biasing member is further defined as a wire clip.

15. The head restraint assembly of claim 13 wherein the longitudinal series of notches are each recessed within the shaft such that rotation of the shaft from the locked position to the released rotary position expands the biasing member out of the recessed notches.

16. The head restraint assembly of claim 15 wherein the longitudinal series of notches each include an upward abutment portion so that the shaft, and consequently the head restraint, are prevented from downward travel in the locked rotary position of the shaft, and the longitudinal series of notches each include a leading edge extending downward from the abutment portion to urge the biasing member out of the notch as a result of an upward force applied to the head restraint in the locked rotary position of the shaft.

17. The head restraint assembly of claim 13 wherein the at least one projection further comprises a slide block oriented between the biasing member and the shaft for engaging the notches of the shaft.

18. The head restraint assembly of claim 13 wherein the shaft further comprises a lengthwise cam for compressing the biasing member and disengaging the at least one projection in the released rotary position of the shaft.

19. A vehicle seat comprising:
a seat back;
at least one rod extending from the seat back;
a head restraint assembly according to claim 11, mounted to the at least one rod.

20. A vehicle seat comprising:
a seat back;
at least one rod extending from the seat back;
a stop mounted to the rod;
a frame mounted to the rod to slide along the rod;
a head restraint mounted to the frame for supporting a head of an occupant;
a shaft cooperating with the stop and the frame, one of the shaft and the stop including a longitudinal series of notches, and the other of the shaft and the stop including at least one projection that engages one of the series of notches in a locked rotary position of the shaft for permitting incremental locking positions of the frame relative to the stop, such that the at least one projection is disengaged from the series of notches in a released rotary position of the shaft for sliding the head restraint and frame along the rod, the shaft having one of a cam and follower arrangement; and
an actuator having the other of the cam and follower arrangement in cooperation with the one of the cam and follower arrangement of the shaft for releasing the shaft to slide the head restraint and frame along the rod;
wherein the series of longitudinal notches and the at least one projection cooperate such that height adjustment in an upward direction only is permitted without actuation of the actuator.

* * * * *